US010890911B2

(12) United States Patent
Xiao

(10) Patent No.: US 10,890,911 B2
(45) Date of Patent: Jan. 12, 2021

(54) SYSTEM AND METHOD FOR AUTONOMOUSLY DELIVERING COMMODITY TO THE RECIPIENT'S PREFERRED ENVIRONMENT

(71) Applicant: AUTOX, INC., Grand Cayman (KY)

(72) Inventor: Jianxiong Xiao, San Jose, CA (US)

(73) Assignee: AUTOX, INC., Grand Cayman (KY)

( * ) Notice: Subject to any disclaimer, the term of this patent is extended or adjusted under 35 U.S.C. 154(b) by 279 days.

(21) Appl. No.: 16/041,255

(22) Filed: Jul. 20, 2018

(65) Prior Publication Data

US 2020/0026280 A1    Jan. 23, 2020

(51) Int. Cl.
| | |
|---|---|
| *G05D 1/00* | (2006.01) |
| *B60W 50/10* | (2012.01) |
| *G01C 21/36* | (2006.01) |
| *G06Q 10/08* | (2012.01) |
| *G10L 15/22* | (2006.01) |

(Continued)

(52) U.S. Cl.
CPC .......... *G05D 1/0088* (2013.01); *B60W 50/10* (2013.01); *G01C 21/3608* (2013.01); *G05D 1/0212* (2013.01); *G06K 9/00288* (2013.01); *G06K 9/00362* (2013.01); *G06K 9/00791* (2013.01); *G06Q 10/083* (2013.01); *G10L 15/1815* (2013.01); *G10L 15/22* (2013.01); *B60W 2420/42* (2013.01); *B60W 2540/043* (2020.02); *B60W 2540/21* (2020.02); *B60W 2556/50* (2020.02); *G05D 2201/0212* (2013.01); *G10L 2015/223* (2013.01)

(58) Field of Classification Search
CPC .............. G05D 1/0088; G05D 1/0212; G05D 2201/0212; B60W 50/10; B60W 2540/21; B60W 254/043; B60W 2556/50; B60W 2420/42; B60W 60/00256; G01C 21/3608; G06Q 10/083; G10L 15/22; G10L 15/1815; G10L 2015/223; G06K 9/00791; G06K 9/00288; G06K 9/00362
See application file for complete search history.

(56) References Cited

U.S. PATENT DOCUMENTS

| | | | | |
|---|---|---|---|---|
| 6,760,647 B2* | 7/2004 | Nourbakhsh | ........ | G05D 1/0214 700/245 |
| 7,228,203 B2* | 6/2007 | Koselka | ................... | B25J 5/007 318/568.12 |

(Continued)

*Primary Examiner* — Thomas Ingram

(57) ABSTRACT

A system and method for autonomously transporting and delivering one or more commodities from drop-off point to recipient preferred environment, is disclosed. The system is configured to analyze an authorized person's voice command or request and executes the request. The system provides at least two modes of operation to deliver the commodities comprising mapped location delivery mode and human following delivery mode. The system is configured to analyze the command and extract the delivery location. The system is further configured to identify the location of the point of the interest based on object detection system and environment understanding system, to deliver the commodities. At human following delivery mode, the ADV follows the recipient and saves the location or path data once the preferred environment is located. At mapped location delivery mode, ADV maneuvers itself to the destination location by retrieving information on recipient's previous history of delivering commodities.

20 Claims, 4 Drawing Sheets

(51) Int. Cl.
*G10L 15/18* (2013.01)
*G06K 9/00* (2006.01)
*G05D 1/02* (2020.01)

(56) References Cited

U.S. PATENT DOCUMENTS

| | | | | |
|---|---|---|---|---|
| 7,818,090 B2 * | 10/2010 | Okamoto | ............. | G05D 1/0272 |
| | | | | 700/253 |
| 8,392,065 B2 * | 3/2013 | Tolstedt | ............... | G05D 1/0214 |
| | | | | 701/41 |
| 2005/0216126 A1 * | 9/2005 | Koselka | ................. | B25J 9/0003 |
| | | | | 700/259 |
| 2008/0079383 A1 * | 4/2008 | Nakamoto | ........... | G05D 1/0251 |
| | | | | 318/587 |
| 2009/0024250 A1 * | 1/2009 | Oaki | .................... | G05D 1/0227 |
| | | | | 700/245 |
| 2015/0094879 A1 * | 4/2015 | Pari | ......................... | B25J 5/007 |
| | | | | 701/12 |

\* cited by examiner

SYSTEM AND METHOD FOR AUTONOMOUSLY DELIVERING COMMODITY TO THE RECIPIENT'S PREFERRED ENVIRONMENT

BACKGROUND OF THE INVENTION

A. Technical Field

The present disclosure generally relates to an autonomous vehicle. More specifically, the present invention relates to a system and method for autonomously transporting and delivering one or more commodities to recipient's preferred environment using autonomous delivery vehicle (ADV).

B. Description of Related Art

The level of interest around autonomous delivery vehicle (ADV) has increased dramatically, as it provides a cost-effective solution for businesses involving home delivery services. However, there is still much research and development required on ADV to solve the problem of delivering commodities such as, food, groceries or any items, to reach remote areas. Still, it does not alleviate the problem concerned with the final stage or point of delivery. Because, some recipient's preferred location for the ADV could not be usually accessible due to some facts, for instance, a detailed 3D HD maps incorporated for directing or navigating ADVs are not available for set delivery point inside a building. Henceforth, the recipient needs to manually carry the commodity regardless of its length, weight or bulkiness, from the ADV to their preferred location, e.g., kitchen, storage room of the house or apartment. The final few meters (for example, final 100 meters) of transporting and delivering the commodities is a cumbersome task, particularly when the commodities are heavy in weight, breakable, hot or in awkward shape.

Existing ADVs are not intelligent enough to function as an interactive assistant to the recipient to aid in transport and delivery of commodities to the last few meters from the drop off location. Further, existing ADVs faces difficulty to traverse final 100 meters of the delivery point, because the area around the set delivery point is not accessible, or non-availability of maps to the preferred location. In addition, the ADV has not been there before, or in other words, lacks information or history of delivering commodities to the particular location.

Certain autonomous system has been designed to address the problem of transportation of objects in different day-to-day situations. US20150229906A1 of Luis Carlos Inacio De Matos et al discloses an autonomous system for tracking an individual. The system is adapted to follow a given person and has application in retail areas or any other area that benefits from object carrying technologies that make use of image recognition and artificial intelligence. Above-mentioned prior art autonomous system merely designed to follow individual's instructions, however, said system lacks in receiving an environmental information or an interactive assistant from the recipient.

Henceforth, there is a need for an efficient system and method for autonomously transporting and delivering commodities or goods from drop off point to recipient's preferred environment or location using autonomous delivery vehicle (ADV). The system is also required to enable the recipient to interact with the ADV regarding preferred location to autonomously deliver the commodities or goods. Further, the system is required to retrieve information on their previous history of delivering commodities to execute recipient's preferred delivery of the commodities.

SUMMARY OF THE INVENTION

A system and method for autonomously transporting and delivering commodities or goods from drop off point to a recipient's preferred environment or location using autonomous delivery vehicle (ADV) is disclosed. The system and method according to the present invention, aids in transporting and delivering commodities to the last few meters (for example, final 100 meters) from the drop off location. The commodities could be any items, but not limited to particular items such as, food, grocery, electronic goods or any heavy items. The autonomous delivery vehicle of the system is adapted to maneuver at any preferred environment or structure such as home, private environments, apartments, businesses and schools. The system is further configured to analyze an authorized person's voice command or request and executes the request.

According to the present invention, the system comprises an autonomous delivery vehicle (ADV) in communication with a cloud server. The ADV comprises a computing device including a processor for executing artificial intelligence (AI) software and a memory unit. The ADV further comprises a sensor assembly in communication with the computing device comprising one or more sensors, is configured to collect environmental data around the autonomous vehicle, and an input assembly in communication with the computing device configured to receive input from the recipient. The computing device comprises a processor and a memory unit, wherein the memory unit stores a set of program modules, wherein the processor in communication with the memory unit, configured to execute the set of program modules. In one embodiment, the set of program modules comprises a control module, and a motion planning module, a sensor module, a communication module, an authentication module, a human detection module, and a human interface module, operatively connected to the control module.

In an embodiment, the motion planning module is configured to manipulate a movement of the autonomous delivery vehicle. In one embodiment, the sensor module is configured to collect environmental data of at least a portion of an environment around the autonomous delivery vehicle. The ADV is configured to analyze the environmental data to detect one or more obstacles along the path of the advancing or moving ADV. In one embodiment, the authentication module is configured to receive authentication data to validate the recipient. In one embodiment, the human interface module is configured to receive a request provided by the recipient on authentication of recipient data. In some embodiments, the ADV further comprises map data for locating the position of ADV.

In one embodiment, if the recipient provides a request such as a location to deliver the commodities, a point of interest generator module is configured to identify a location, proximate to the location specified by the recipient, to deliver the commodities. The control and motion planning modules receive path data to maneuver the autonomous delivery vehicle to reach the location provided by the recipient.

For example, if the requested command is "follow me to kitchen", the ADV is configured to follow the recipient to the delivery location. The control and motion planning modules receive path data to maneuver the autonomous delivery vehicle to follow the path of the recipient. In another embodiment, the ADV is configured to store the discovered path in the memory unit and enabled to use the same data, if the recipient requests a same location to deliver one or more commodities in future. For example, if the requested command is "deliver to kitchen", the ADV utilizes the previously discovered path to deliver one or more commodities in the requested delivery location.

In one embodiment, a method to autonomously transport and deliver one or more commodities from drop-off point to recipient preferred environment, is disclosed. At one step, an autonomous vehicle comprising a computing device including means for executing artificial intelligence device (AI) software is provided. At another step, a sensor assembly in communication with the computing device comprising one or more sensors configured to collect environmental data around the autonomous vehicle is provided. At another step, an input assembly in communication with the computing device configured to receive input from the recipient is provided. The computing device comprises a processor and a memory unit, wherein the memory unit stores a set of program modules, wherein the processor in communication with the memory unit, configured to execute the set of program modules. The set of program modules comprises control module, motion planning module, an obstacle detection module, a face authorization module, a human detection module, a human interface module, a localization module, a scene segmentation module and a human detector module.

The motion planning module is configured to manipulate a movement of the autonomous delivery vehicle. The obstacle detection module is configured to collect environmental data of at least a portion of an environment around the ADV. The ADV is configured to analyze the environmental data to detect one or more obstacles along the path of the advancing ADV. The face authorization module is configured to receive authentication data from the recipient. The ADV is configured to detect a request provided by the recipient on authentication of recipient data.

At another step, the authentication data of the recipient is verified. At another step, a request from the recipient is received, at the autonomous delivery vehicle. If the request provided is a command to follow the recipient to kitchen, the ADV is configured to follow the recipient to the delivery location to deliver the commodities, and the control and the motion planning module manipulate the autonomous delivery vehicle to follow the recipient. The ADV is configured to store the discovered path in the memory unit and enabled to use the same data, if the recipient requests a same location to deliver one or more commodities in future. For example, if the requested command is "deliver to kitchen", the ADV utilizes the previously discovered path to deliver one or more commodities in the requested delivery location Other features and advantages will become apparent from the following description of the preferred embodiments, taken in conjunction with the accompanying drawings.

BRIEF DESCRIPTION OF DRAWINGS

The embodiments herein will be better understood from the following detailed description with reference to the drawings, in which.

DETAILED DESCRIPTION OF EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

Figure 1:
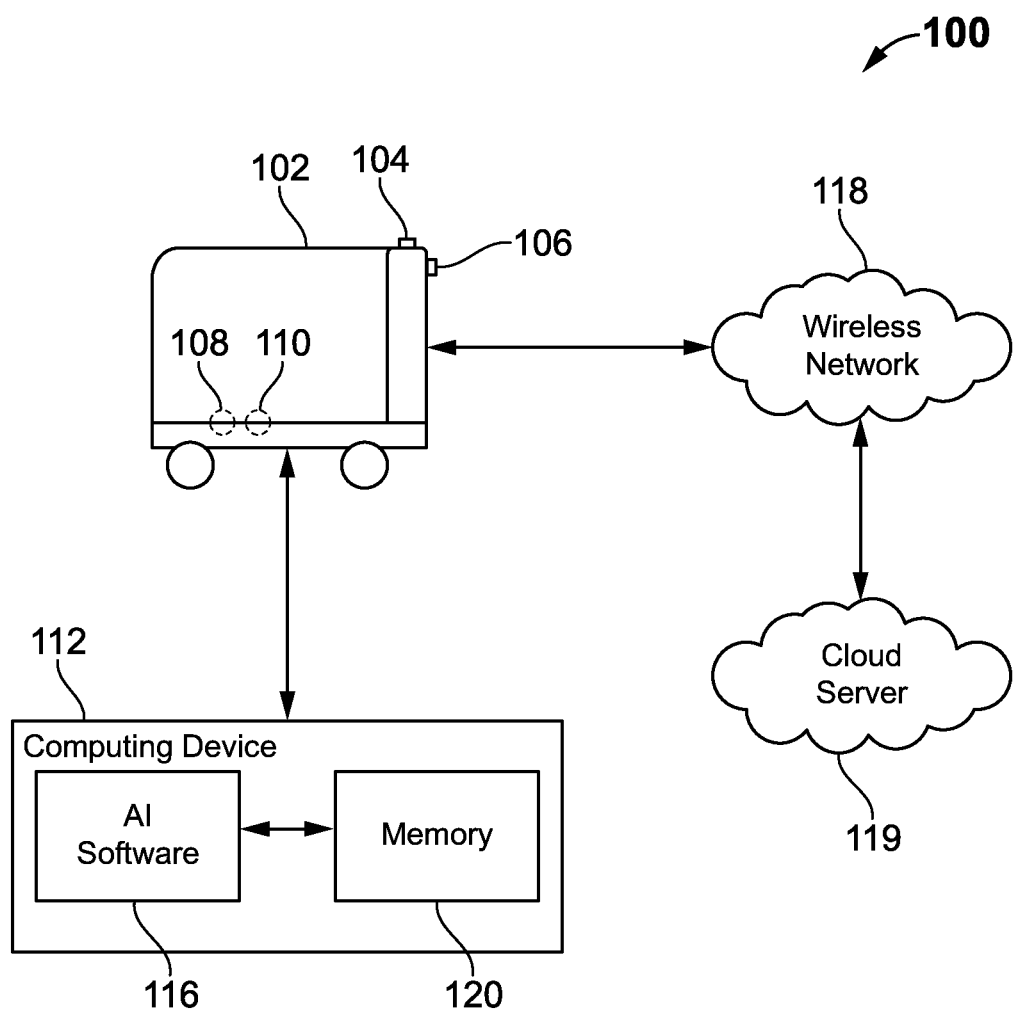
FIG. 1 shows an environment for autonomously transporting one or more commodities from drop off point to recipient preferred environment, utilizing autonomous delivery vehicle (ADV), according to an embodiment of the present invention.

FIG. 1 shows an environment 100 of a system to autonomously transport and deliver one or more commodities from drop off point to recipient preferred environment, utilizing autonomous delivery vehicle (ADV) 102. The system comprises an autonomous delivery vehicle (ADV) 102 in communication with a cloud server 119, via a wireless network 118, a microphone 104, a camera 106, an inertial measurement unit (IMU) sensor 108, and a wheel encoder 110. The ADV 102 comprises a computing device 112 including a processor for executing artificial intelligence (AI) software 116 and a memory unit 120. The camera 106 is disposed at the top front portion of the ADV 102. The inertial measurement unit (IMU) sensor 108 is disposed at a rear axle of the ADV 102. The wheel encoder 110 is disposed at the rear axle of the ADV 102. In one embodiment, the memory unit 120 comprises user data for authentication purpose, map, data relating to obstacles in the environment around the ADV 102 that is received from the sensor module, destination data of the autonomous delivery vehicle 102, and data relating to the commodities in the autonomous delivery vehicle 102

In an embodiment, the computing device 112 is at least one of a general or special purpose computer. In an embodiment, it operates as a single computer, which could be a hardware and/or software server, a workstation, a mainframe, a supercomputer, a server farm, and so forth. In an embodiment, the wireless network 118 could be a global area network (GAN), such as an internet, a wide area network (WAN), a local area network (LAN), or any other type of network or combination of networks. The autonomous delivery vehicle 102 of the system is adapted to maneuver at any structure such as home, private environments, apartments, businesses, and schools. The system is further configured to analyze an authorized person's voice command or request and extract a delivery location. For instance, if the user issues a command to follow me to kitchen, the system is configured to follow the recipient to the delivery location, using map data and IMU data, to deliver the commodities at the kitchen.

In one embodiment, if the recipient provides a request such as a location to deliver the commodities, the ADV 102 is configured to identify a location specified by the recipient to deliver the commodities. The control and motion planning modules receive path data to manipulate the autonomous delivery vehicle 102 to reach the location provided by the recipient.

In one embodiment, if the recipient provides a request such as follow the recipient, the ADV 102 is configured to follow the recipient to the delivery location. The control and motion planning modules receive path data to manipulate the autonomous delivery vehicle 102 to follow the path of the recipient. In another embodiment, the ADV 102 is configured to store the discovered path in the memory unit and enabled to use the same data, if the recipient requests a same location to deliver one or more commodities in future.

Figure 2:
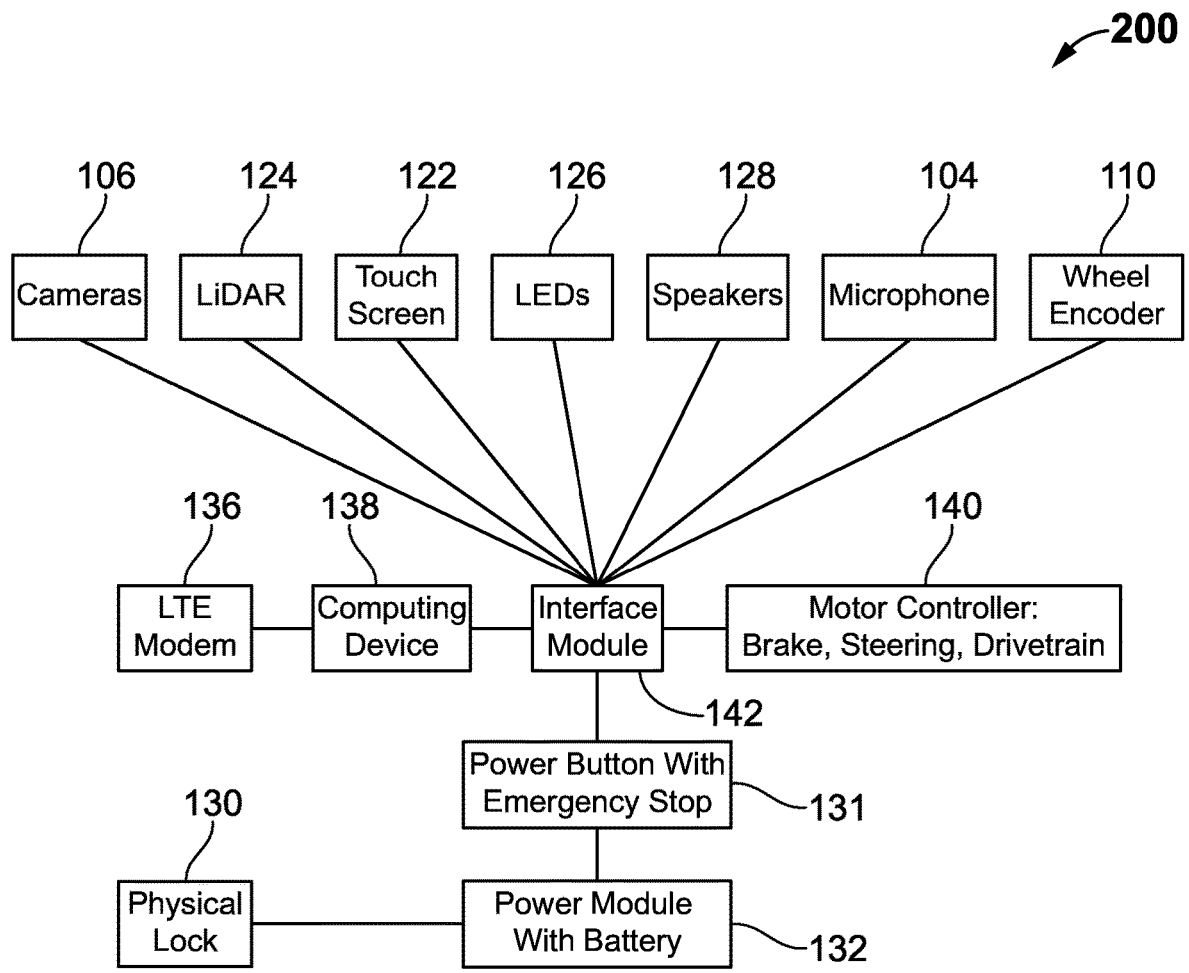
FIG. 2 shows a block diagram illustrating exemplary hardware components of an autonomous delivery vehicle, according to an embodiment of the present invention.

FIG. 2 shows a block diagram 200 illustrating exemplary hardware components of an autonomous delivery vehicle, according to an embodiment of the present invention. In one embodiment, the ADV 102 comprises a touch screen 122, the camera 106, a LiDAR sensor 124, LEDs 126, speakers 128, microphone 128, and wheel encoder 129, motor controller 140 including brake, steering units, drivetrain etc., a physical lock 130, a power switch 131 for emergency shutdown of ADV 102 and a power module with battery 132, in communication with an interface module 142. The autonomous delivery vehicle 102 further comprises LTE modem 136 coupled to the computing device 138 or control module. In one embodiment, the motion planning module comprises motor controller 140 including brake, steering units, drivetrain etc., The data from the interface module 142 is utilized by the computing device 138 for controlling the ADV 102.

During operation of the ADV 102, the ADV 102 arrives at the destination such as at a door of a house, structure or building, the recipient is enabled to authentic himself to the ADV 102 by providing authentication data via the touch screen 122, or face authentication using camera 106. In an embodiment, the ADV 102 employs various authentication means such as using One Time Password (OTP) data, biometric data, electronic cards, etc. On authentication of the recipient, the ADV 102 creates a vision recognition of the recipient. After authentication, the recipient is enabled to provide command or request to assist the recipient to deliver the commodities at the desired location. In one embodiment, the request could be provided via speech or other input means. If the recipients input a request to follow him, the ADV 102 is configured to follow the recipient. Here, the ADV 102 depends on the vision recognition to follow the recipient.

Figure 3:
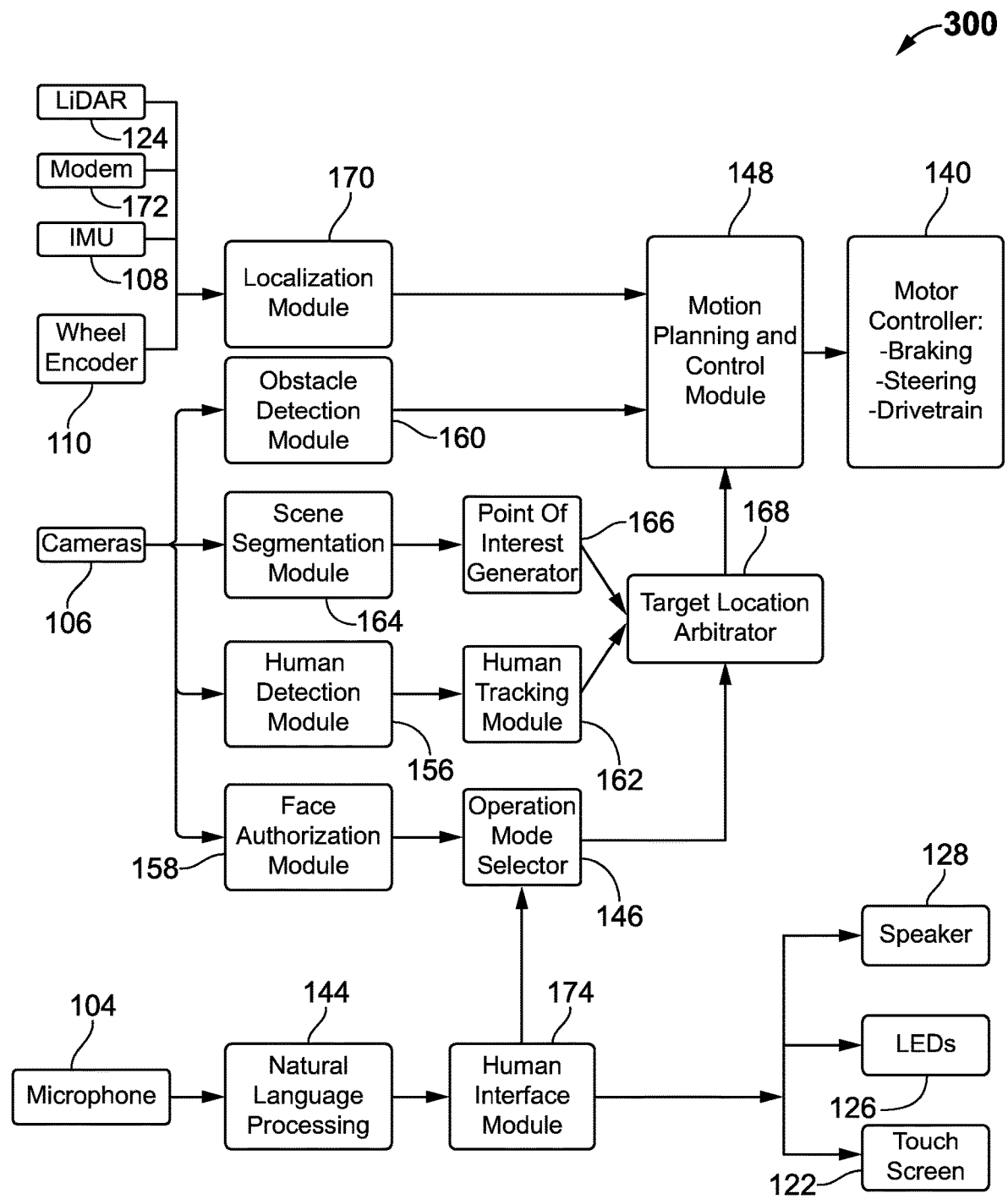
FIG. 3 shows a block diagram illustrating exemplary components of an autonomous delivery vehicle configured to autonomously transport one or more commodities from drop off point to recipient preferred environment, according to an embodiment of the present invention.

FIG. 3 shows a block diagram 300 illustrating exemplary components of an autonomous delivery vehicle 102, which is configured to autonomously transport one or more commodities from drop off point to recipient preferred environment, according to an embodiment of the present invention. In one embodiment, the processor in communication with the memory unit comprises a set of program modules. The processor is configured to execute the set of program modules. In one embodiment, the set of program module comprises localization module 170, obstacle detection module 160, scene segmentation module 164, human detection module 156, face authorization module 158, natural language processing unit 144, human tracking module 162, operation mode selector 146, human interface module 174, target location arbitrator 168 and motion planning and control module 148. In some embodiments, one or more speakers 128, LEDs 126, touch screens 122 are in communication with the human interface module 174. In one embodiment, the microphone 104 is in communication with the natural language processing unit 144. In one embodiment, the cameras 106 are in communication with the obstacle detection module 160, scene segmentation module 164, human detection module 156, face authorization module 158. In one embodiment, LiDAR 124, Modem 172, IMU 108, wheel encoder 110 is in communication with the localization module 170. In one embodiment, the motion planning and control module 148 is coupled to the motor controller 140.

The recipient is enabled to provide a request via touch screen or microphone to the ADV 102 to deliver the commodities. In one embodiment, the system provides at least two options or modes to deliver the commodities to a desired location of the recipient, which comprises a human following delivery mode and a mapped location delivery mode. The term "human following delivery mode" is defined as the mode that enables ADV to follow the person or recipient instruction for delivering the commodities in desired location, wherein the location could be a mapped or unmapped location. The term "mapped location delivery mode" is defined as the mode that enables ADV to deliver the commodities in desired location by utilizing the previously discovered path or past delivery history (already mapped route) stored in the memory unit.

In one embodiment, the recipient is enabled to initiate any mode by simple voice commands. The input received from the recipient via the microphone 104 is sent to the natural language processing (NLP) unit 144. In one embodiment, the ADV 102 accepts request only after recipient authentication. The NLP unit 144 analyses an authorized person's voice command and provides mode selection signal to operation mode selector 146. Based on the voice command, the scene segmentation module 164, point of interest generator 166, target location arbitrator 168 determines the target location.

At human following delivery mode, the recipient is enabled to provide a request to follow to reach the desired location (for example, kitchen) of the recipient. The camera 106 detects the recipient via a human detection module 156. Further, the ADV 102 is configured to verify the face of the recipient using the face authorization module 158 and tracks the recipient during operation or movement of the ADV 102 via a human tracking module 162. The ADV 102 assumes the position of the authorized recipient as the target position and follows the recipient with the obstacle detection module 160, and planning and control module 148. In another embodiment, the ADV is configured to store the discovered path in the memory unit and enabled to use the same data, if the recipient requests a same location to deliver one or more commodities in future.

At mapped location delivery mode, the recipient is enabled to provide a location to deliver the commodities via speech, for example, deliver commodities or goods in kitchen. The obstacle detection planning and control module 148 actuates an actuator 150 to direct the ADV 102 to the target zone. The ADV utilizes the previously discovered path to deliver one or more commodities in the requested delivery location such as kitchen. Both point of mapped location delivery mode and human following delivery mode could be terminated by human voice commands, e.g. "stop here".

Figure 4:
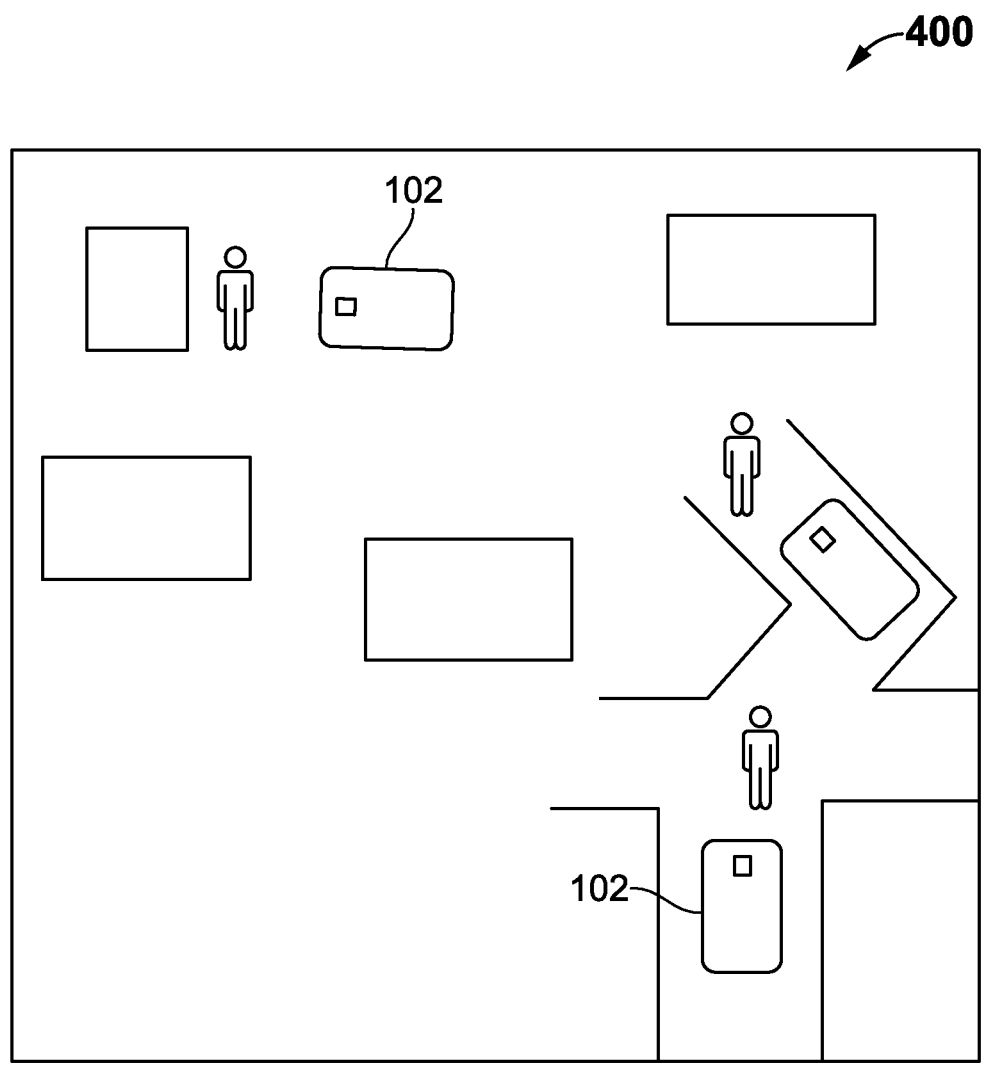
FIG. 4 shows an environment of the autonomous delivery vehicle operating in "follow me" mode, according to an embodiment of the present invention.

FIG. 4 shows an environment 400 illustrating movement of the autonomous delivery vehicle 102 towards the destination location such as location of a recipient, according to an embodiment of the present invention. In one embodiment, a method for controlling an autonomous delivery vehicle at a drop point by the recipient is disclosed.

At one step, an autonomous vehicle comprises a computing device with a means for executing artificial intelligence device (AI) software is provided. At another step, a sensor assembly in communication with the computing device comprising one or more sensors configured to collect environmental data around the autonomous vehicle is provided. At another step, an input assembly in communication with the computing device configured to receive input from the recipient is provided. The computing device comprises a processor and a memory unit, wherein the memory unit stores a set of program modules, wherein the processor in communication with the memory unit, configured to execute the set of program modules. The set of program modules comprises a control module, a motion planning module, an obstacle detection module, a face authorization module, a human detection module, a human interface module, a localization module, a scene segmentation module and a human detector module.

The motion planning module is configured to manipulate a movement of the autonomous delivery vehicle. The obstacle detection module is configured to collect environmental data of at least a portion of an environment around the ADV. The ADV is configured to analyze the environmental data to detect one or more obstacles along the path of the advancing or moving ADV. The face authorization module is configured to receive authentication data from the recipient. The ADV is configured to detect a request provided by the recipient on authentication of recipient data.

At another step, the authentication data of the recipient is verified. At another step, a request from the recipient is received, at the autonomous delivery vehicle. If the request provided is a command to follow the recipient, the ADV is configured to assume a location of the recipient as the location to deliver the commodities, and the control and the motion planning module manipulate the autonomous delivery vehicle to follow the recipient. If the request provided is a location to deliver the commodities, the control and motion planning module is configured to manipulate the autonomous delivery vehicle to reach the location provided by the recipient.

According to the present invention, the system and method assists in autonomously transporting and delivering commodities or goods from a drop off point to a recipient's preferred environment or location using autonomous delivery vehicle (ADV) 102. Further, the system aids in transporting and delivering commodities to the last few meters (for example, final 100 meters) from the drop off location. Further, the system is configured to retrieve information on their previous history of delivering commodities to execute recipient's preferred delivery of the commodities. The commodities could be any items, but not limited to particular items such as, food, grocery, electronic goods or any heavy items.

The foregoing description comprises illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein.

What is claimed is:

1. A system for autonomously transporting one or more commodities from a drop-off point to recipient preferred environment, comprising:
    an autonomous vehicle comprising a computing device including means for executing artificial intelligence device (AI) software and map data;
    an inertial measurement unit (IMU) sensor configured to generate IMU data;
    a sensor assembly in communication with the computing device comprising one or more sensors configured to collect environmental data around the autonomous vehicle;
    an input assembly in communication with the computing device configured to receive input from the recipient, wherein the computing device comprises a processor and a memory unit, wherein the memory unit stores a set of program modules, wherein the processor in communication with the memory unit, configured to execute the set of program modules, wherein the set of program modules comprise:
    a control module,
    a motion planning module operatively connected to the control module to manipulate a movement of the autonomous delivery vehicle,
    an obstacle detection module operatively connected to the control module comprising one or more sensors configured to collect environmental data of at least a portion of an environment around the autonomous delivery vehicle to detect one or more obstacles located therein,
    a face authorization module operatively to the control module configured to receive authentication data from the recipient,
    a human detection module operatively connected to the control module and one or more camera,
    a human interface module configured to detect a request provided by the recipient on authentication of recipient data,
    a human tracking module configured to track the recipient to obtain a trajectory of the recipient, and
    a point of interest generator module,
    wherein when an another request containing a destination is received at or before the drop off point, controlling the autonomous vehicle to deliver the one or more commodities from the drop-off point to the destination;
    wherein when the request provided is a command to follow the recipient to a location, the control module and the motion planning module are configured to manipulate the autonomous delivery vehicle to follow the recipient to deliver the commodities using a path data generated by the control module and the motion planning module base on the trajectory of the recipient, the map data, and the IMU data, and the point of interest generator module is configured to store the path data used to follow the recipient, and
    wherein when the request provided is a specific location to deliver the commodities and when a path data of the specific location is stored in the memory, the control module and the motion planning module are configured to manipulate the autonomous delivery vehicle to reach the location provided by the recipient utilizing the stored path data.

2. The system of claim 1, wherein the input assembly comprises a microphone for receiving the request from the recipient.

3. The system of claim 1, wherein the program module comprises natural language processing unit in communication with the microphone.

4. The system of claim 1, wherein the authentication module comprises a face authorization module configured to verify the recipient face on receiving the command to follow the recipient.

5. The system of claim 1, wherein the program module further comprises a scene segmentation module configured to identify characteristics of an environment around the autonomous delivery vehicle, and a human detector module configured to detect a presence of the recipient.

6. The system of claim 1, wherein the autonomous delivery vehicle further comprises a localization module for locating the position of ADV.

7. A method for autonomously transporting one or more commodities from a drop-off point to recipient preferred environment via an autonomous vehicle, comprising:
when a first request containing a destination is received, controlling the autonomous vehicle to deliver the one or more commodities from the drop-off point to the destination;
determining whether an authentication data is input by a recipient who locates at about the destination for receiving the one or more commodities;
authenticating the recipient when the authentication data is received;
determining whether a second request from the recipient is received when the recipient is authenticated successfully, the second request comprising a command to follow the recipient to a location and a command to a specific location;
when the command to follow the recipient is received, controlling the autonomous vehicle to follow the recipient to deliver the one or more commodities from the destination to a delivery location, the delivery location is a specific location in the destination; or
when the command to a specific location in the destination, controlling the autonomous vehicle to deliver the one or more commodities from the destination to the specific location along a stored path data or a planning path data based on stored map data, and environment data detected by sensors disposed at the autonomous vehicle.

8. The method of claim 7, further comprising:
storing a path following the recipient from the destination to the delivery location, and the planning path.

9. The method of claim 7, wherein the step of controlling the autonomous vehicle to follow the recipient to deliver the one or more commodities from the destination to a delivery location, comprising:
generating the planning path data base on a trajectory of the recipient, stored map data, and environment data detected by sensors disposed on the autonomous vehicle; and
delivering the one or more commodities from the destination to a delivery location using the planning path data.

10. The method of claim 7, further comprising:
providing an interface displayed on the autonomous vehicle to enable the recipient to input the authentication.

11. The method of claim 7, wherein the second request is an voice request input via a microphone.

12. The method of claim 7, when the second request is the command to specific location, controlling the autonomous vehicle to deliver the one or more commodities from the destination to the specific location along a stored path data or along a planning path data based on environment data detected by sensors disposed at the autonomous vehicle and stored map data, comprising:
when the second request is the command to specific location, searching a storage for a path from the destination to the specific location; and
when the path from the destination to specific location does not exist in the storage, planning a path from the destination to specific location based on the map data and environment data detected by sensors disposed at the autonomous vehicle.

13. The method of claim 12, further comprising:
when the path from the destination to specific location exists in the storage, setting the existed path from the destination to specific location as the stored path.

14. An autonomous vehicle, for autonomously transporting one or more commodities from a drop-off point to recipient preferred environment, comprising:
a plurality of sensors, and
a computer device, communicated with the plurality of the sensors, comprising:
a storage configured to storage programs; and
a processor configured to execute the programs to perform a method of autonomously transporting one or more commodities from a drop-off point to recipient preferred environment, the method comprising:
when a first request containing a destination is received, controlling the autonomous vehicle to deliver the one or more commodities from the drop-off point to the destination;
determining whether an authentication data is input by a recipient who locates at about the destination for receiving the one or more commodities;
authenticating the recipient when the authentication data is received; and
determining whether a second request from the recipient is received when the recipient is authenticated successfully, the second request comprising a command to follow the recipient to a location and a command to a specific location;
when the command to follow the recipient is received, controlling the autonomous vehicle to enter into a human following deliver mode that the autonomous vehicle follows the recipient to deliver the one or more commodities from the destination to a delivery location, the delivery location is a specific location in the destination; or
when the command to a specific location in the destination, controlling the autonomous vehicle to enter into a mapped location deliver mode that the autonomous vehicle delivers the one or more commodities from the destination to the specific location along a stored path data or a planning path data based on stored map data, and environment data detected by sensors disposed at the autonomous vehicle.

15. The autonomous vehicle of claim 14, wherein the method further comprises:
storing a path following the recipient from the destination to the delivery location, and the planning path.

16. The autonomous vehicle of claim 14, wherein the step of controlling the autonomous vehicle to follow the recipient to deliver the one or more commodities from the destination to a delivery location, comprising:

generating the planning path data base on a trajectory of the recipient, stored map data, and environment data detected by sensors disposed on the autonomous vehicle; and delivering the one or more commodities from the destination to a delivery location using the planning path data.

17. The autonomous vehicle of claim 14, wherein the method further comprises:

providing an interface displayed on the autonomous vehicle to enable the recipient to input the authentication.

18. The autonomous vehicle of claim 14, wherein the second request is an voice request input via a microphone.

19. The autonomous vehicle of claim 14, wherein when the second request is the command to specific location, controlling the autonomous vehicle to deliver the one or more commodities from the destination to the specific location along a stored path data or along a planning path data based on environment data detected by sensors disposed at the autonomous vehicle and stored map data, comprising:

when the second request is the command to specific location, searching a storage for a path from the destination to the specific location; and when the path from the destination to specific location does not exist in the storage, planning a path from the destination to specific location based on the map data and environment data detected by sensors disposed at the autonomous vehicle.

20. The autonomous vehicle of claim 19, wherein the method further comprises:

when the path from the destination to the specific location exists in the storage, setting the existed path from the destination to specific location as the stored path.

* * * * *